Jan. 19, 1932. B. C. PLACE 1,842,283
AUTOMOBILE ROOF OR SIMILAR CONSTRUCTION
Filed Nov. 12, 1927 2 Sheets-Sheet 1
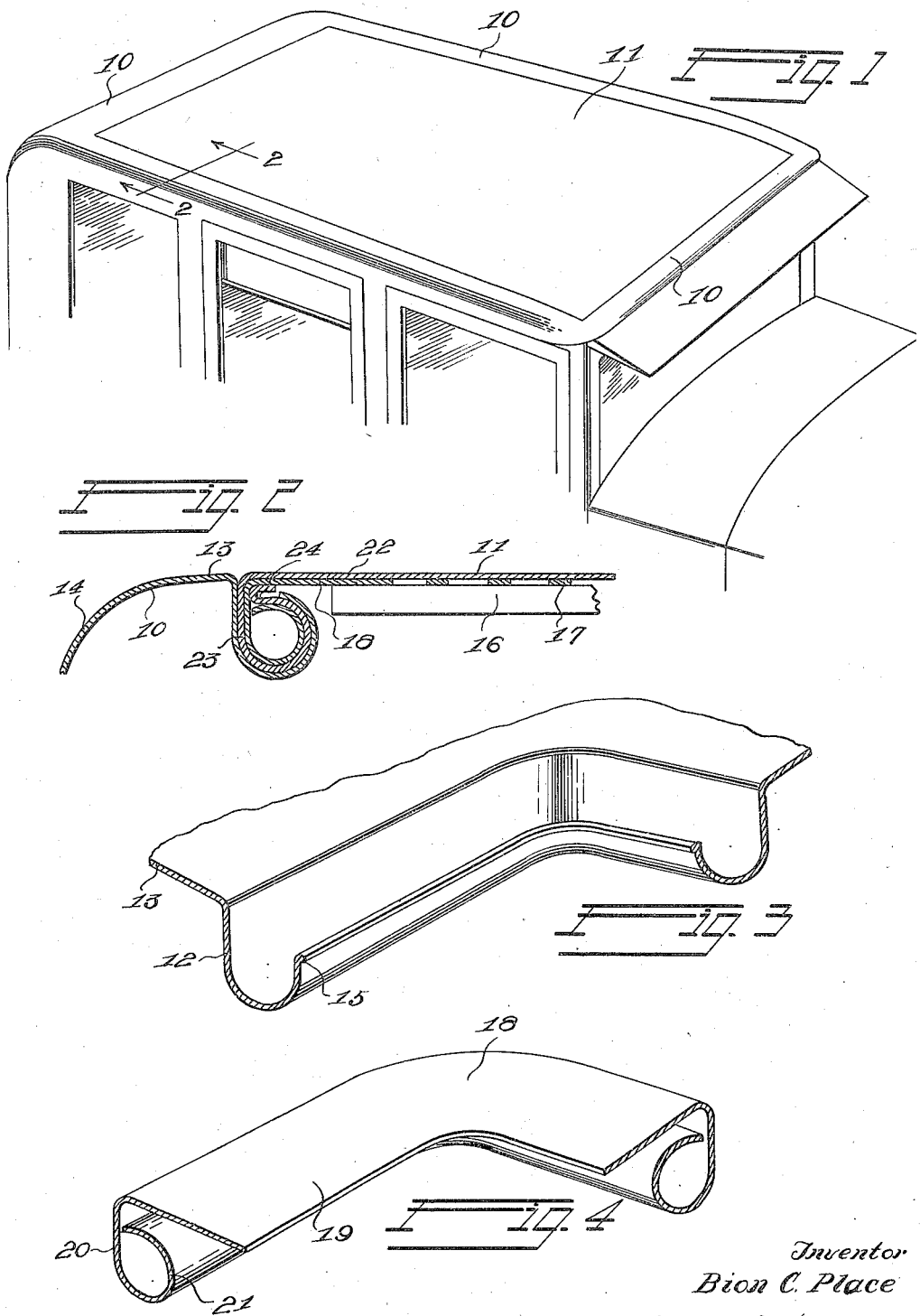
Inventor
Bion C. Place
James W. Hoffman
Attorney Jan. 19, 1932.　　　　B. C. PLACE　　　　1,842,283
AUTOMOBILE ROOF OR SIMILAR CONSTRUCTION
Filed Nov. 12, 1927　　2 Sheets-Sheet 2
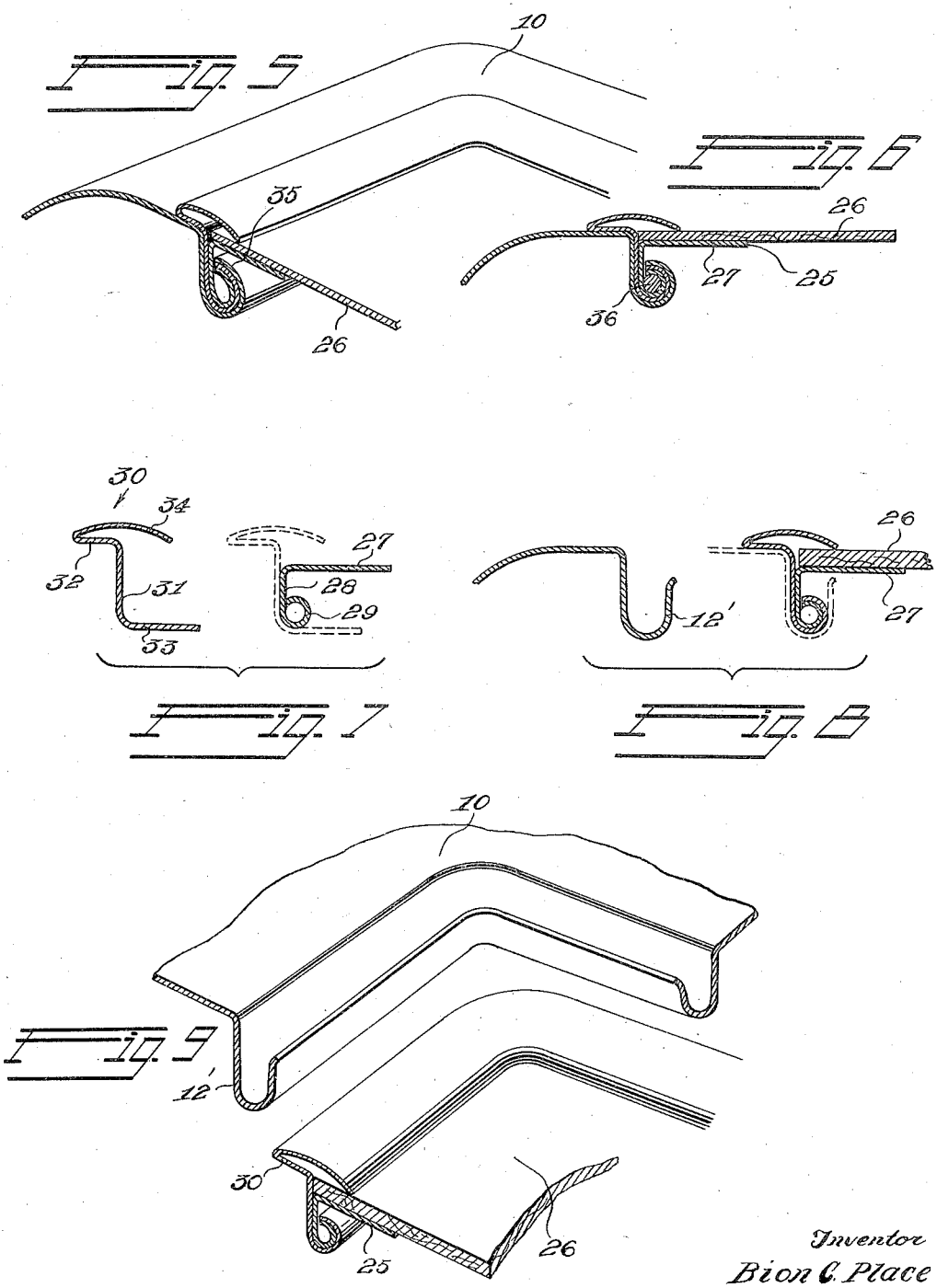
Inventor
Bion C. Place
James G. Hoffman
Attorney Patented Jan. 19, 1932

1,842,283

UNITED STATES PATENT OFFICE

BION C. PLACE, OF DETROIT, MICHIGAN, ASSIGNOR OF ONE-HALF TO GEORGE E. GAGNIER, OF DETROIT, MICHIGAN

AUTOMOBILE ROOF OR SIMILAR CONSTRUCTION

Application filed November 12, 1927. Serial No. 232,805.

This invention relates to a novel joint designed particularly for use in joining the roof to the body of closed types of automobiles, though the invention may be used in other types and portions of automobiles or similar vehicles, or in other relations.

The primary object of the invention is to provide a practicable joint for an automobile roof which roof may or may not be assembled apart from the car to which it is to be applied, and which joint may be completed in a simple, economical and expeditious manner, to hold the parts in assembled relation.

A further object of the invention is to provide a thoroughly practical, simple and inexpensive arrangement for conveniently joining a fabric or fibre panel to a metallic supporting structure of any kind.

A further object of the invention is the provision of a joint between a suitable metallic supporting structure of any kind and a non-metallic panel, that may be assembled expeditiously with said structure and which presents therewith a simple interlocked joint.

A still further object of the invention is to provide an automobile roof or similar construction embodying a downwardly projecting projection or rib, which rib is designed to be entered into a matching recess arranged adjacent the upper wall of the body proper and to be interlocked therein, the walls of said recess serving to effectively hold the roof in position.

A still further object of the invention is to produce an automobile roof or similar construction that is neat in appearance, that may be produced and assembled at a relatively low cost and which, at the same time is thoroughly effective as a cover for the body of the vehicle.

Still further objects of the invention will appear as the description thereof proceeds with reference to the accompanying drawings, in which—

Figure 1 is a perspective view of a portion of an automobile equipped with the improved roof construction of this invention.

Figure 2 is a cross sectional view of the preferred form of this invention taken on the plane indicated by the line 2—2 on Figure 1, the frame of the side of the vehicle to which the roof is applied being omitted.

Figure 3 is a perspective view of a portion of the trough or gutter member that is formed at the upper edge of the body around the opening.

Figure 4 is a perspective view of a section of the metal deck or roof panel edge reinforcing member.

Figure 5 is a perspective view of a corner of an improved roof construction embodying this invention but showing a modification of the invention illustrated in the figures just described.

Figure 6 is a sectional view of a modified construction differing slightly from that shown in Figure 5.

Figure 7 is a sectional view showing the panel reinforcing members in separated relation, the right hand portion of this figure showing in dotted lines the manner in which said members are brought together.

Figure 8 is a sectional view showing the assembled deck panel and the member that surrounds the roof opening in spaced relation, the same figure showing by means of dotted lines the position of the parts after the deck or roof panel has been applied to said member but before the panel is firmly secured in place.

Figure 9 is a perspective view of sections of the parts shown in Figure 8 illustrating further the manner of assembly of said parts.

Like reference characters indicate like parts throughout the several figures.

In the construction shown in Figures 1, 2, 3 and 4 the improved roof construction of this invention comprises a member 10 preferably constructed of metal that surrounds the opening to which a panel 11, constituting the main portion of the roof is to be applied. Preferably, but not necessarily, member 10 is formed by carrying the metal sheathing of the sides and ends of the body over the top of the side and end frame construction, to avoid joints around the extreme edges of the cover or roof. As shown best in Figure 3, member 10 comprises a trough or gutter portion 12 and portion 13 extending outwardly from one of the side walls of the trough 12, portion 13 being preferably downwardly inclined or rounded, as shown at 14, in order to shed the water over the edges of the roof. As shown in Figure 1, portion 13 is integral with the metal side and end sheathing. The trough or gutter portion 12 may be provided with a flange or beaded edge 15 the upper edge of which is somewhat below the portion 13 so that the deck or roof panel may be flush with said portion.

The body of the deck panel 11 may comprise transverse members 16 and longitudinal members 17 suitably secured together to form a frame, which frame is securely fastened in any suitable manner to an open frame 18, preferably made of metal. The construction of the frame 18 is shown best in Figure 4. As shown in this figure, said member comprises a horizontal portion 19, a downwardly projecting portion or flange 20, and an upwardly and inwardly curved portion 21 formed to provide a tubular or beaded portion projecting downwardly and inwardly from the edges of the horizontal portion of said member, for a purpose presently to be described. The frame 18 is covered with a deck panel cover 22 of any suitable fibrous or other flexible material. As shown best in Figure 2, the flexible cover 22 is drawn downwardly as shown at 23 and upwardly around the beaded portion 21 of member 18, the extreme edge thereof being secured temporarily to the panel frame by tucking said edge between said beaded portion and the under surface of portion 19 of frame member 18, as shown by the numeral 24 of Figure 2. The covered deck panel thus constructed is applied to the vehicle by inserting the covered bead or roll 21 in the channel 12 above referred to. In order to firmly and securely hold the panel in place and at the same time evenly hold the flexible panel covering in firm contact therewith, the free edge of trough 12 is bent outwardly so that the edge embraces the bead or roll 21, and the flexible material wrapped therearound.

In the form of the invention shown in Figures 5 to 9 inclusive, a construction is shown in which the body of the panel is constructed of a stiff non-flexible material. In these figures the member 10 is substantially the same as that above described referring to Figures 1 to 4, except that the channel 12' (Figures 8 and 9) may be made of less width.

In these figures an open frame 25 is provided. This frame is preferably constructed of sheet metal and a panel cover 26 of stiff non-flexible, preferably fibrous, material of any known composition, is arranged on a horizontal or shelf portion 27 of said frame. The edge of said frame is flanged downwardly as shown at 28 and the extreme edge of said flange is curved inwardly to form a bead 29. In order to hold the frame 25 and the member 26 in assembled relation and cover the joint a molding 30 is provided. Said molding has a vertical portion 31 and flanges 32 and 33 extending in opposite directions from said vertical portion. As shown best in Figure 7 the edge of flange 32 is rebent to form a curved resilient tongue 34. In order to secure the molding just described to the panel frame member, the portion 31 of said molding is brought against portion 28 of the frame and the extreme edge of flange 33 is bent around bead 29. The height of portion 31 of the molding is so proportioned that the resilient tongue 34 will bear yieldingly but firmly upon the edge of cover 26 of the deck panel providing, as shown in Figure 8, a line contact with said cover that effectively keeps the moisture from entering beneath said tongue. The deck panel just described, as in the form shown in Figures 1, 2, 3 and 4, may be assembled apart from the vehicle to which it is to be applied. After such assembly it is brought into position and bead 29 with the molding 30 secured thereto, as just described is inserted in the channel 12' of member 10. In order to hold the panel in permanent assembled relation with respect to member 10 the free edge of the trough or channel 12' is bent outwardly as shown at 35 in Figure 5.

If desired the bead 29 may be provided with a reinforcing wire or rod 36 as shown in Figure 6. Similar reinforcing means may be provided in the bead or roll 21 in the form of the invention shown in Figures 1 to 4 inclusive.

In the use of this invention the upper edges of the car body to which the roof is to be applied are provided with a frame 10 including the channel 12 or 12' by carrying the side and end sheathing over the top of the side and end frame members, or such frame may be separately formed and suitably secured over the top of the frames of the sides and end. The deck panel is then constructed apart from the car where it may be expeditiously made because of the ease of handling a unit that is constructed independently of the relatively inaccessible top of the body to which it is to be applied. Said panel may be built up after the manner shown best in Figure 2 with or without the transverse and longitudinal members 16 and 17 or after the manner shown best in Figure 9. After the panel has been constructed as above described, it is positioned on the body to which it is to be applied with its depending bead portion projecting in the channel provided for its reception. The free edge of the channel is then bent outwardly to firmly secure the parts in permanent position.

It will be understood by those skilled in the art that the invention is applicable in relations other than that above specifically described, that it is not confined to a roof construction but may be used wherever it is desired to connect a fabric or fibrous panel to a metallic supporting structure. It will also be understood that the novel joint above described may be applied to one or two or more of the edges of the panel as may be desired.

It will be observed that a simple and practicable water-tight construction is thus provided that is composed of few parts, that may be readily and cheaply constructed, and in which the covering material is firmly held in position without the use of driven fasteners. At the same time the completed roof presents a neat and attractive appearance having smooth rounded edges and a penel constituting the body thereof.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as my invention is:

1. The method of joining a fibrous or similar panel of an automobile body to a metallic supporting structure, which includes securing the panel to a frame, providing said frame with an interlocking member extending substantially coextensively with the edges thereof, providing said metallic supporting structure with a member formed to receive said first named member, positioning said members in interlocked relation to each other and bending a portion of one of said members so as to hold them in assembled relation.

2. The method of joining a fibrous or similar panel of an automobile body to a metallic supporting structure, which includes securing the panel to a frame, providing said frame with a downwardly projecting member having interlocking means, providing said metallic supporting structure with a channel formed to receive said first named member, positioning said member and channel in interlocked relation to each other and bending a portion of said channel into substantially continuous engagement with said means to hold the panel in assembled relation with respect to said structure.

3. The method of joining a panel having a non-metallic body to a metallic supporting member of an automobile body which consists in forming the supporting member with a channel, arranging the body material of the panel on a frame constituting a supporting element providing said element with a bead, securing said body material to said supporting element by means that surrounds a portion of said bead, inserting the assembly thus formed in said channel and bending a wall of said channel substantially continuously around a portion of said bead to firmly interlock said panel to said supporting member.

4. The method of assembling a panel including non-metallic body material to a metallic supporting member of an automobile body which consists in providing said metallic supporting member with a channel, providing a supporting frame having a supporting surface and a downwardly projecting beaded flange, arranging the body material of said panel on said supporting surface and securing an edge of said material to said supporting element by means that embraces the bead, inserting the beaded flange of said supporting element and means in said channel and then bending a portion of a wall of said channel substantially continuously around a portion of said bead to hold said panel in assembled relation with respect to said supporting member.

5. In combination, a supporting member surrounding an opening in an automobile or similar body, a panel closing said opening and composed of body material and a supporting frame secured to said body material and having a portion extending downwardly therefrom and being provided with a bead, and means constituting a part of said supporting member and substantially continuously embracing a portion of said bead for holding said panel in said frame in assembled relation to said member.

6. In combination, a supporting member surrounding an opening in an automobile or similar body provided with a channel arranged below the top surface of said member, a panel closing said opening and composed of a body of non-metallic material having an edge supporting frame secured thereto, said frame extending angularly with respect to the outer surface of said body and being provided with a bead formed to snugly fit said channel, said panel and frame being held in assembled relation with respect to said supporting member by substantially continuously bending a portion of the wall of said channel around said bead.

7. In combination, a supporting member surrounding an opening in an automobile or similar body provided with a channel, a panel closing said opening and composed of body material and a supporting frame to which said body material is secured, said frame being provided with a beaded flange extending away from said body material, said beaded flange constituting a means to secure said body material to said supporting element, said panel being held in interlocked relation in said channel by entering said bead into said channel and by substantially continuously bending a portion of the wall of said chanel around a portion of said bead to hold the parts in assembled relation.

8. In combination, a supporting member surrounding an opening in an automobile or similar body and provided with a channel extending along an edge thereof, a panel closing said opening and composed of a supporting frame provided with a downwardly projecting beaded flange and non-metallic body material secured to said supporting element by means that embraces said bead, said panel being arranged with said beaded flange in said channel and held in position therein by substantially continuously bending a portion of said channel around said bead and said means for holding the body material in assembled relation with respect to said supporting element.

9. In combination, a supporting member surrounding an opening in an automobile or similar body and provided with a channel, a panel closing said opening and composed of a supporting element having a supporting portion and a beaded flange extending away from said portion, body material arranged on said supporting portion and having an edge wrapped around said bead and temporarily held in position between said bead and the under surface of said suppporting portion, said bead with the body material wrapped therearound being entered in said channel and held therein by bending a portion of the wall of said channel into substantially continuous engagement with a portion of said bead.

10. An automobile roof construction comprising an open frame secured to the side and end walls of the automobile body, said frame being provided with a channel opening upwardly, and a roof panel including a panel frame provided with a downwardly projecting beaded flange and a non-metallic cover, said panel being disposed in said open frame with said beaded flange in the channel provided therein, said panel being interlocked with said open frame by bending a portion of a wall of said channel substantially continuously around a portion of the beaded flange on said panel.

11. In combination, a supporting member surrounding an opening in an automobile or similar body and provided with a channel, a panel closing said opening and composed of a non-metallic body arranged on a supporting frame, said supporting frame being provided with a flange extending downwardly from said body and provided with a bead formed to enter said channel, a wall of said channel being bent substantially continuously about a portion of said bead to hold said panel and frame in assembled relation with respect to said member.

BION C. PLACE.